June 15, 1965  E. W. OWENS  3,189,209
CLOSURE FOR CONTAINERS
Filed May 21, 1963  2 Sheets-Sheet 1

INVENTOR.
EDWARD W. OWENS
BY Cushman, Darby & Cushman
ATTORNEYS

June 15, 1965   E. W. OWENS   3,189,209
CLOSURE FOR CONTAINERS
Filed May 21, 1963   2 Sheets-Sheet 2

INVENTOR.
EDWARD W. OWENS
BY
Cushman, Darby & Cushman
ATTORNEYS

3,189,209
CLOSURE FOR CONTAINERS
Edward W. Owens, Muscatine, Iowa, assignor to Thatcher Glass Manufacturing Company, Inc., New York, N.Y., a corporation of New York
Filed May 21, 1963, Ser. No. 282,076
11 Claims. (Cl. 215—40)

The present invention relates to a novel construction for internally lined closure caps and a method of making the same.

Container closures and caps adapted to be used with glass bottles and jars, containers formed from metal, ceramic and vitreous materials and the like, have of recent years been made from various metal materials, and plastics, such as phenol and urea-formaldehydes, and other moldable resins, cellulose acetate and the like. Almost always, closures of this class, whether of the "snap-on," crown, or screw-on type, require a separate and distinct lining material or sealing element which must be sufficiently soft to permit sealing when entering evaporable liquids and materials. Sealing is also desirable to protect solid and liquid materials from spoilage or contamination due to contact with the atmosphere. To this end, liners and sealing elements have been made of cork and plastic compositions, cellulosic and paper materials variously treated, rubberlike compositions and soft metals and alloys.

Closures having such separate elements possess an inherent disadvantage in that a difficulty is encountered when manufacturers attempt to insert and mechanically secure the liner in the closure during fabricating and capping machine operations.

In such fabricating operations, it is often necessary to employ at least one separate operation to place and secure the liner in the closure before joining the closure with the container. These operations are time-consuming and expensive, since the liners and closures are necessarily small elements, difficult to store, separate, and assemble. In practice, it has also been necessary that prior art liners have a definite rigidity, thickness and mass to permit ease in manufacturing, storing, handling and assembling, etc. Even more rigid standards and attendant quality control problems are required when the liner is employed in a closure designed for repeated reuse, as in the case of screw-type closures.

Conventional container closures having separate liners are known for the tendency the liners have to fall out. It is customary to ship closures with the liners in them, and, in large canning and bottling factories, to place the closures in hoppers, where they are fed individually and applied to containers. The agitation of the closures both during shipment and while in the hoppers may dislodge the liners. Obviously, if the closure is applied to the container without a liner, there is no seal and the product may spoil or leak out of the container, rendering the entire package unsuitable for sale, and sometimes even damaging adjoining packaged products.

If a liner survives the original fabricating operations, it must also survive the hazards of use, a situation that is worsened by the necessity for the liner to be pliable and find frictional resistance with the container opening. Thus, ordinary screwing and unscrewing of a closure may cause a liner to loosen.

In other instances, the contents of the container may be tacky, often bonding the liner to the rim of the container. The result is such that, when removing the cap or lid from the bottle or jar, the liner readily separates from the closure and remains on the rim of the container, making it necessary to pry and tear the liner off to use the contents. The consumer ordinarily throws the liner away rather than to continue to pry it off after each removal of the closure. When the liner is thrown away, the closure is no longer adapted to form an effective seal and the product deteriorates rapidly, causing dissatisfaction on the part of the consumer.

Prior art closures have attempted to overcome the above disadvantages by requiring a series of manufacturing steps, such as pasting, gluing, fusing, stamping, molding, shaping and casting, etc., to produce some sort of inexpensive and economical adhesive or locking action to fasten the liner in the closure. It has been found in practice, however, that these known adhesive techniques are still subject to the disadvantage of loosening in the manufacturing process and in use. Moreover, such devices are difficult to produce and assemble since they require additional application, drying and/or heating and fusion steps. However, the most serious objection is an economic one, residing in the necessity for adhesive expenditure, and the time and machinery necessary for the extra operations.

The prior art has also suggested a mechanical adhesive technique to overcome earlier disadvantages and eliminate separate adhesive and fusion steps by providing the inner cover portion and/or skirt portion of screw type closures with protruding elements that will engage with a separable liner and generally prevent it from loosening and falling out. While this procedure is meritorious from the standpoint of eliminating the use of glue and similar adhesives, it is objectionable in that the liner insert must be of sufficiently gross size, mass and rigidity to permit effective interlocking with the protruding elements depending from the inner closure cover and skirt. The protruding elements themselves must be relatively large to be effective and this in turn raises difficulties in the molding operation. If the closure is permitted to harden on the mold, the protrusions will be substantially destroyed on removing a screw-type closure from the mold force. Commonly, the closure must be removed in a flaccid condition to save the protrusions, and this results in a separate closure curing step, to say nothing of the care that must be taken in handling flaccid closures prior to cure.

If too small an insert is employed, it will wrinkle, fold and double over on being screwed and unscrewed from any container offering resistance in terms of sticky contents, rough container edges, and the like, thus becoming readily useless. For these reasons, this "mechanical-adhesive" procedure is restricted to the use of significantly large liner inserts which find obvious economic disfavor because of the amount of liner material needlessly expended and wasted. When considered in terms of millions of liner closures, this excessive use of liner material amounts to staggering proportions.

It would therefore be desirable to provide a closure liner, using a small amount of liner material, and yet eliminating the use of separate adhesive applying or well known curing and fusion steps. It would also be desirable if the number and cost of operations could be reduced. For example, it would be preferable to conserve the amount of heat that is commonly necessary to completely insure that a liner is integrally fused to the inner closure cover.

Accordingly, it is a principal object of this invention to produce a container closure and liner therefor that are not subject to the disadvantages of the prior art.

It is an essential object of this invention to produce a container closure with a "locked-in" liner prepared from a desirably small amount of material and minimum number of fabrication steps.

It is then an object to provide a container closure having a body portion consisting of a cover portion and a depending internally threaded skirt, said cover portion having an inner surface provided with a plurality of planar disturbances comprising pitched locking elements and smaller disturbances comprising protrusions extending into and out of said cover portion and under and above said inner surface, the pitch of the locking elements being inclined at an angle to the face of the inner surface, a plastic deformable internal disc-shaped liner coextensive with said inner surface, male and/or female planar disturbances molded on and in said disc and engaging with said locking elements and protrusions whereby said liner and closure are locked together to increase resistance against separation of the same.

Still another object of this invention is to provide a container closure molded with undercut elements and protrusions suitable for the "locking-in" of the liner of this invention.

The objects of this invention are accomplished by providing a "snap-on" or threaded type container closure comprising, in combination, a body portion having a plurality of planar disturbances comprising pitched locking elements and a plurality of protrusions and a plastic material forming an internal lining in said container closure, a portion of said plastic material substantially surrounding, filling and engaging said planar disturbances and being locked in place therewith. It is an important economic feature of this invention that these novel planar disturbances are formed during the molding operation, simultaneous with the formation of the closure itself, thus eliminating the expense of separate operations. By using this novel constructoin, the present invention offers the added economic advantage of doing away with the need for separate adhesion, fusion and gluing steps for locking the liner in place.

More particularly, the present invention involves the production of a threaded type container closure comprising in combination, a body portion having a substantially cylindrical side wall or skirt portion provided with threads on the inside surface thereof, and one substantially circular head wall or cover portion, the inside of said cover portion being provided with a plurality of pitched locking elements and smaller protrusions, each of said locking elements extending from, and/or under said head wall and being inclined at an angle to the face thereof, and a plastic material forming an internal lining in said container closure, a portion of said plastic material substantially engaging each of said locking elements and being secured and affixed therewith, the smaller protrusions being dispersed among the pitched elements. It is another surprising advantage of the present invention that the pitched locking elements are formed in situ and within the closure such that the closure may be substantially or completely cured and then easily removed, due to the particular pitch thereof, without the use of special molding devices. Moreover, the smaller protrusions or projections are sufficiently small due to permit ease of removal from the mold, and yet sufficiently large to provide the desired locking action.

Other objects and advantages of this invention will be obvious to those skilled in the art when reference is had to the following description and drawings, wherein.

Identical reference numerals have been employed to indicate identical parts throughout the several views of the drawings.

Figure 1:
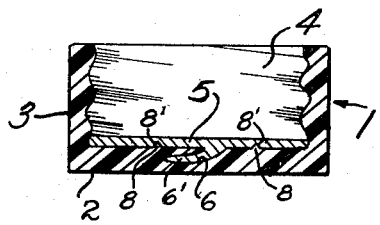
FIGURE 1 represents a partial sectional view of an inverted container closure having a liner "locked-in" according to this invention predominately by means of pitched undercut locking elements in combination with conical protrusions.

Referring now to the drawings, and more particularly to FIGURE 1, there is shown a threaded container closure indicated generally at 1. The closure may be made of any suitable material, for instance polystyrene plastic although the features of the invention may be utilized in closures made of other plastic and/or metal or composition materials.

The closure comprises the usual head wall or cover portion 2 and depending side wall or skirt 3. A suitable thread 4 is formed on the inner wall to co-operate with a corresponding thread on a container (not shown) for which this closure is adapted. A liner 5, conveniently made, for instance, of polyethylene plastic, is affixed to the inside surface of the cover portion. When the closure is screwed on a container, this liner is compressed sufficiently to form a seal in the rim of the container to prevent the contents from escaping or spoiling as is common with such lining elements.

Figure 2:
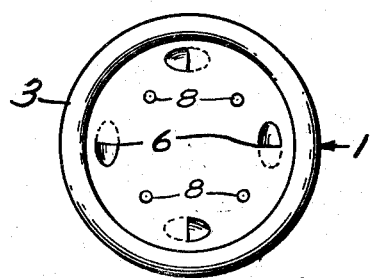
FIGURE 2 represents a top view of a container closure of FIGURE 1, with the liner removed to show the undercut elements and conical protrusions of this invention.

According to this invention the closure is also provided with a series of novel undercut female locking elements 6 and a plurality of conical protrusions 8 shown extending respectively into and from the inside surface of the closure cover portion. As illustrated, liner 5 is provided with integral corresponding "locking knobs" 6' that substantially completely fill and take the shape of the undercut elements 6, and "conical openings" 8' which similarly take the shape of and coact with conical protrusions 8. Undercut elements 6 and the corresponding "locking knobs" having shapes discussed hereinafter, are inclined slightly to the left in FIGURE 1 to firmly grip the liner 5 and to assure the rotation thereof with the closure when it is turned counter-clockwise (or clockwise when viewed from the inside of the closure as shown in FIGURE 2) for removal. Conical protrusions 8 are of lesser size than the undercut elements and "locking knobs," and serve to insure the locking in action desired for securing the present liner. Because of their lesser size, protrusions 8 may be placed or oriented in any manner and do not have to correspond to the pitch of elements 6.

When the closure is rotated clockwise and screwed home onto the container, the "locking knobs" and "conical openings" engage and exert sufficient frictional contact on the upper surface of the liner material 5 to close the same on the container without affecting the resultant seal on the rim of the container. When the cap is unscrewed again, these projections and openings forcibly rotate the liner with the cap, thereby breaking any frictional or adhering bond which may exist between the rim of the container and the liner. In this way, the frictional and adhering forces, resulting from tacky fluids or the like, normally tending to hold the liner on the rim of the container are overcome so that the liner will come off the container with the closure. Moreover, and due to the method of producing the liner of this invention, the same is also held secure in the closure as a result of the complete vacuum-type sealing thereof with the ambient atmospheric pressure.

Due to this novel construction, the liner of this invention, while not glued to the cover portion of the closure, is nevertheless forcibly removed from the rim of the container when the closure is turned counter-clockwise for removal so that it will come off the container and remain in the closure. During assembling and the application of the closures to containers, the frictional resistance resulting from the "locking knobs" and "conical openings," and the above-mentioned vacuum-resistance, causes the liner to rotate with the closure even when the sealing pressure becomes sufficient to compress the liner to conform to the shape of the container. The shaping of the liner as the closure is screwed home increases the frictional resistance to rotation as soon as an effective seal has been obtained, and thereby minimizes breakage of the closures.

Figure 3:
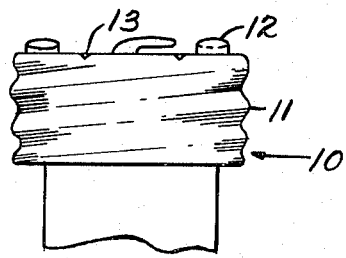
FIGURE 3 is a side view of a solid molding pin with projecting forces suitable for use in producing container closures of FIGURES 1 and 2.

In FIGURE 2, four undercut elements 6 and four conical protrusions 8 are shown on the inside of the container closure of this invention. A plurality of these undercut elements and conical protrusions may be arranged in varying numbers and in circular fashion to accommodate the unscrewing action that is necessary to remove the closure of this invention from the forming die or molding force (FIG. 3). As shown by the dotted lines, the undercuts project fairly deeply under the inside cover portion and can easily extend under for an amount equal in size to the exposed portion denoted by solid lines. The horizontal length and the vertical depth of the undercut elements should form an angle equal to the pitch of the threads 4 in order to accommodate the unscrewing of the closure from the molding member when a threaded closure is produced. Note that the open ends of the undercut elements pictured in the drawing vary in direction, and depending on their radial location within the closure are generally parallel to the thread adjacent that point. This is a necessary feature of this invention since the horizontal length of the undercut element is limited in order to permit unscrewing from the molding member. As indicated above, however, this is not true for the conical protrusions 8 since they are small enough to find ready disengagement from their molding force. In spite of their size, however, they remain sufficiently large to ensure secure locking of the liner with the closure.

Turning now to FIGURE 3, there is illustrated a solid molding pin, generally indicated by the reference numeral 10, and provided with threads 11 and projecting male forces 12 and undercut conical female forces 13. Threads 11 correspond to threads 4 of the closure in FIGURE 1 and are the means by which said latter threads are formed. Projecting forces 12 form the undercut elements 6, while the conical female forces 13 form conical protrusions 8.

Figure 5:
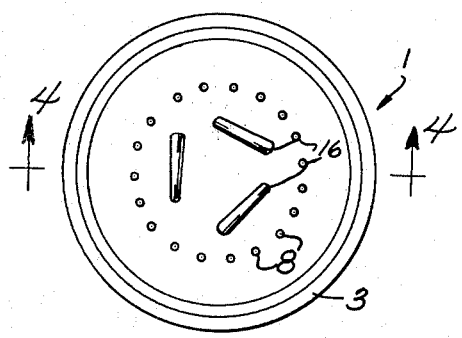
FIGURE 5 represents a top view of the container closure of FIGURE 4, showing the pitched protruding locking elements and conical protrusions of this invention.
Figure 4:
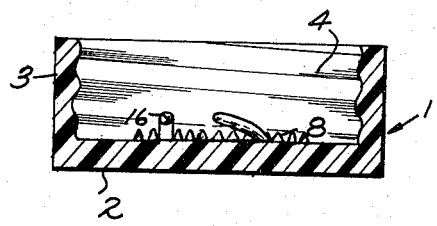
FIGURE 4 represents a sectional view of an inverted container closure according to another embodiment of this invention having a liner "locked-in" according to this invention predominately by means of pitched protruding locking elements in combination with conical protrusions.

Referring to FIGURES 4 and 5, it is seen that these figures are similar to FIGURES 1 and 2, respectively, but differ therefrom in the substitution of pitched protruding locking elements 16 for undercut locking elements 6. If shown, there would be a corresponding substitution in the liner of pitched "locking undercuts" for the "locking knobs" in FIGURE 1. Closure 1, cover portion 2, depending side wall 3, thread 4 and conical protrusions 8 all perform the same functions as in FIGURE 1.

Quite obviously, the modification of FIGURES 4 and 5 can be produced on a molding force similar to that of FIGURE 3, but differing only in the substitution of female undercuts (not shown) for the male forces 12. It has been found that protruding elements 16 will work about equally as well as the undercut elements 6, although it has been found that the original modification of FIGURE 1 understandably requires somewhat less liner material.

Figure 7:
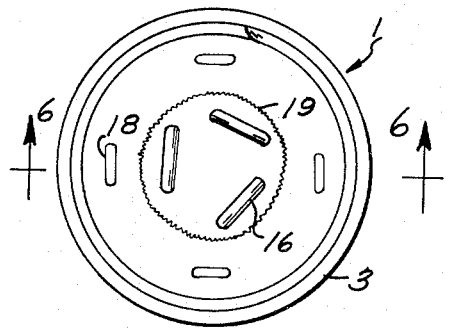
FIGURE 7 represents a top view of the container closure of FIGURE 6, showing the pitched planar elements, oblong protruding elements and shape of the recessed area.
Figure 6:
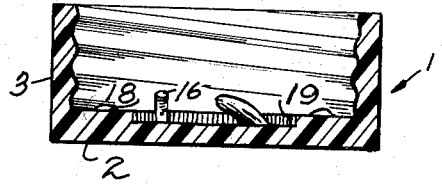
FIGURE 6 represents another embodiment of the closure of FIGURE 4 in top view with the pitched protruding locking elements grouped in a recessed area having a tooth encrusted circumference for additional securance, and provided with a plurality of small oblong protrusions.

To recover some of this additional liner material, reference is had to the third modification shown in FIGURES 6 and 7 which are views similar to FIGURES 1 and 2 and 5 and 6, but with the protrusions 16 of FIGURE 4 gathered in a circle 19 that is recessed and provided with small circumferential teeth that will provide additional locking features. In FIGURES 6 and 7 also, conical protrusions 8 are replaced with oblong protrusions 18 of similarly low relative height. It will be apparent that virtually any design may be used to simulate the additional locking action of members 8 and 18. It is also envisioned that members such as 8 and 18 may be intermixed with one another to provide such additional locking action as may be desired.

It is quite obvious that those skilled in the art will experiment and determine new shapes and combinations of shapes for planar disturbances in the form of the locking elements and the small protrusions that will enhance the locking of the lining with the closure. Protrusions 8 and 18 need only be of very small size, about .051 to .508 millimeter high, to exert the action desired and it does not matter whether they are of regular shape. They can even be somewhat mutilated during removal from the mold (in the case of a completely cured closure) and still exert the locking action desired.

Figure 8:
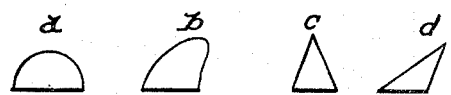
FIGURE 8 shows a plurality of pitched locking element shapes in plan view.
Figure 8:
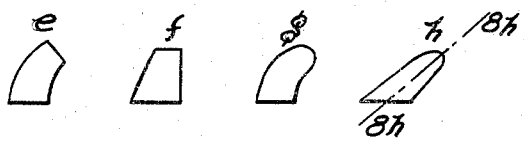
Figure 8:
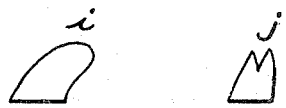

In FIGURE 8 are seen ten shapes in plan view, denoted by reference characters *a* through *j*, which are alternative shapes that may be substituted for and correspond to the shapes of the locking elements 6 and 16 seen in plan view in FIGURES 2, 5, and 7. These shapes are also understood to be alternate plan view designs for the projecting forces 12 in FIGURE 3, which forces directly result in the locking elements 6 and 16, and indirectly results in corresponding "locking knobs" and "locking undercuts" as discussed previously. Shapes *a* through *j*, whether in the form of members 6 or 16, will slope downwardly or upwardly respectively, and extend under and from the inside head of cover portion 2 in FIGURES 1, 4, and 6. Some of these shapes are seen to incline generally to the right in FIGURE 8 in order to permit projecting forces 12 or corresponding locking elements 6 and 16 not shown to be unscrewed from closure cap 1 after it has been formed by, and solidified on, the mold force 10. Accordingly, the angular inclination of the axis or pitch of the center line of these shapes in plan view, the line such as 8*h*—8*h*, should be approximately equal to the horizontal circular pitch or angle of displacement of the elements 6 (FIG. 2) and 16 (FIGS. 4 and 6) to permit the corresponding molding forces to be unscrewed from the reasonably rigid material from which closure cap 1 is formed, without deleteriously affecting the freshly formed closure cap or causing it to fracture.

This angular displacement may vary from 75° to 89°30′, measuring the angle between a vertical plane through a diameter of the circle and its intersection with the horizontal axis of each locking element, although a pitch of about 87° is preferred.

Figure 9:
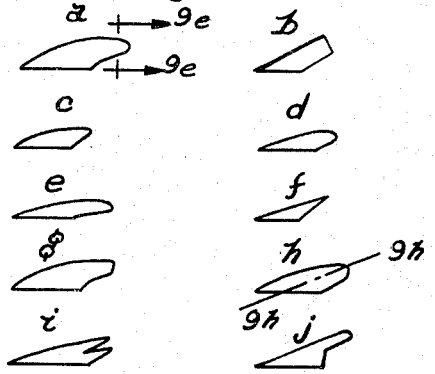
FIGURE 9 shows a plurality of pitched locking element shapes in side elevation.

In FIGURE 9 are depicted ten shapes in side elevation, denoted by reference characters *a* through *j*, and respectively representing alternative side-elevational shapes of the locking elements 6 and 16, as well as the corresponding molding forces. It is to be understood that each of these side-elevation shapes may have any or all of the plan view shapes shown in FIGURE 8 and may have relatively any usable cross-sectional shape. Thus, the shapes 9*a* through 9*j* are given by way of illustration only and are not to be considered as limitative. These elements may have virtually any shape in cross-section and thus cutting plane 9*a*—9*a* may show a circular, elliptical, or other shape in cross-section.

The criterion to be employed in selecting such plan view shapes is that the axis or center line of each shape in side elevation, such as the line 9*h*—9*h*, should also be inclined in side elevation at a pitch or angle of elevation which is approximately equal to the vertical pitch of the screw threads 11 in FIGURE 3, to permit the unscrewing of molding forces 12 from the inside of cover portion 2 (FIGS. 1 and 4) without substantially deforming the material of construction thereof. The length or depth of the undercut elements is also limited by this unscrewing step and by the thickness of the cover portion 2 of the closure cap.

The angular displacement or pitch may vary from 30′ to 15°, measuring the angle between a horizontal plane and the center line of the element viewed in side elevation, although an angle of about 3° is preferred.

Thus, with reference to both FIGURES 8 and 9, the present locking elements will have axes or center lines disposed in three-dimensional orientation of about 87° from a vertical plane end about 3° from the horizontal.

It is to be understood that this invention is not limited to the particular shapes shown in FIGURES 8 and 9 and that it will be obvious to those skilled in the art that these shapes are given merely by way of illustration and may be subjected to variations. For example, each plan view shown in FIGURE 8 may have virtually any of the side elevational shapes shown in FIGURE 9. Also, the shapes of both these figures may have virtually any cross-sectional shape that is found to be operable. Thus, the shapes already employed have only been limited by the technical difficulties necessary in producing the forming die.

While polyethylene and polystyrene have been indicated, respectively, as the materials of construction of the liner and closure of this invention, it is within the contemplation of this invention that other materials of construction may also be suitably employed. For example, generally flexible thermoplastic resins such as cellulose ethers and esters, polyvinyl materials, polyamids, polyesters, poly (halogenated hydrocarbons), polyolefins, and generally thermoplastic polyurethanes and synthetic rubbers, and including mixtures and copolymers of these materials, may be used for the construction of the liner of this invention. A flexible, low density polyethylene material is preferred, however. These same materials, in thermosetting or substantially more rigid thermoplastic forms including linear polyethylene, polypropylene and polystyrene, and general thermosetting resins, such as urea-, phenol- and melamine-formaldehyde type condensation products, epoxy resins, and thermosetting polyester and alkyd resins, are contemplated as the materials of construction for the closure of this invention. Moreover, it is to be understood that the closure can also be formed from any desired metal, glass, ceramic, wood or other composition or combination of materials. For example, use may be made of a fiber and filler reinforced plastic composition.

The material of construction of the closure of this invention, such as polystyrene, along with suitable plasticizers, solvents, and fillers, etc., is injected or inserted as a preform or in a fluid state, into any desired type of female molding forms in a manner well understood in the art. Male or female forces, similar to those illustrated in FIGURE 3, are then used to shape the above polystyrene composition into a plurality of closures, similar to that shown in FIGURES 1 and 4 respectively, followed by suitable cooling, solidifying, drying, baking, or curing steps. After the closure is hardened, it is removed from the mold by unscrewing.

Reference may be had to the following example wherein there is illustrated a desired procedure for producing the lined closure of this invention.

*Example*

The interior body of the closure cap according to this invention is preferaby formed from a solid molding pin similar to that shown in FIGURE 3 and using a polystyrene molding composition.

This composition was inserted into a suitable female mold, followed by the insertion of molding pin 10 and the closing and sealing of the mold containing these elements. The whole structure was heated by electricity at a pressure of about 20,000 pounds per square inch for about 10 seconds. The mold was then permitted to cool to about 150° F. to solidify the molding composition somewhat and free it from the mold components. Cooling can be facilitated by circulating a cooling fluid, e.g., water or air, through the mold parts.

The closure body can be stripped from the mold while in the partially hardened state, since the somewhat flaccid and flexible condition will permit this, albeit with obvious distortion of the closure cap parts. For this reason, it is preferred that the present closure cap be allowed to cool and harden to a point where it will withstand unscrewing from molding pin 10 to preserve its appearance and increase its utility.

A low density polyethylene lining maerial (for example, one obtained from the Du Pont Company of Wilmington, Delaware under the trademark "Alathon 20") was then sprayed by means of a nozzle, or like device, into the closures, completely filling the undercut elements and surrounding the various projections while the closures are travelling on a conveyor. A rotating chuck can also be employed in a manner well understood in the art. The entire lining procedure is followed by a suitable drying or curing step at about 70° F. It is also possible to squirt or press thinner or thicker liner compositions into the closures but a low viscosity material is employed here for reasons of economy. For example, a paste or thick lining composition may be employed to prevent the lining composition from shrinking out of undercut elements 6 as it dries and forms or "locks" in place. Generally, however, a low density polyethylene material is desirable for use in this invention since it has been found in practice to substantially retain its shape does not undergo any undesired shrinking, and adequately locks in place within the meaning of this invention. The solvent may be a plasticizer which is a solvent for polyethylene at a temperature above room temperature as in the usual and well-known "plastisol" situation with vinyl resins.

The drying and curing step may be carried out at temperatures within the range of 60 to 80° F. for 10 seconds to 2 minutes. Also, more than one heating step may be employed. However, one drying step at about 70° F. for 2 seconds is desired for the purposes of economy to yield a perfectly suitable result.

Low density polyethylene is flexible, odor free, inert to edible materials, exhibits high lubricity and forms a good seal with even the most uneven and irregular bottle openings due to its ease of plastic deformation. Low density polyethylene is also preferred since it does not require a degree of heat or sufficiently strong solvents that might deleteriously affect the polystyrene material of the closures. Moreover, while low density polyethylene does not bond to polystyrene, it is highly desirable due to its extremely low cost and relatively great commercial availability. For this reason, the undercut element construction illustrated is to be preferred in the instance of such highly desirable, and yet non-bonding materials. Obviously, materials that do bond will be afforded even greater anti-frictional properties by the construction of this invention than has been available heretofore.

By the squirting or spraying procedure of this invention, there is provided a closure with an integrally "formed-in" or "locked-in" place line. Because of such a procedure, it has been found that the liner of this invention may be thinner and require less material than has been possible heretofore with separable or "flowed-in" liners, due to the use and particular shape of the undercut elements 6 and projections 16 which provide the locking-in feature. For example, the depth of the undercut is often greater than the thickness of the liner 5. Accordingly, pitched locking elements 6 and 16 obviate the need for any adhesive material and/or a separate adhesive, assembling or pre-coating step as is usually the case in the art and for this reason, the process of this invention lends itself readily to high speed automation and further reduces the cost of closure lining operations in terms of fewer operations and simpler machines.

It is also within the contemplation of this invention that the closure may be formed by any desired procedure that is known in the art. While a plastic molding procedure has been illustrated, it is also to be understood that the closure cap can be constructed from one or more metals, glasses or ceramic compositions by any desired stamping, forging, casting, molding or other shaping processes. When using a metal cap, for example, the undercut elements may be produced by a machining, milling, drilling, gouging or etching process.

Although it is also possible to construct the liner of this invention from metal, glass, ceramic or thermosetting materials, thermoplastic materials are generally preferred due to their ease in handling, solvent dissolution properties, and their generally lower melting points. It is to be understood, however, that according to this invention, it is only necessary for the liner material employed to be shapable or formable by some process that will cause it to flow or be forced into the pitched locking elements 6 and 16 and plastic materials are also generally preferred in this regard. Moreover, plastic materials are sometimes preferred as liner materials since they are amenable to flexible deformation and elastic recovery and thereby normally provide an effective and reusable seal for gaseous, liquid and finely dispersed solid compositions that are normally placed in containers.

Due to the flowing type process involved in the preparation of the liner of this invention, a closure liner is provided without the use of adhesive material or other pre-coating applications. Due also to this flowing-in-place process, the liner of this invention does not require any of conventional preforming procedures and lends itself readily to high speed automatic operations, with consequent reductions in cost and increasing efficiency. For example, the liner can be sprayed, squirted or pressed into the closure as the latter travels on a conveyor as in conventional lining machines.

It is to be understood that various changes may be made in the form, construction and arrangement of the parts herein without departing from the spirit and scope of the invention and without sacrificing any of its advantages and it is to be understood that all matters herein are to be interpreted as illustrative and not in a limiting sense, but only as set forth in the following claims.

What is claimed is:

1. A container closure having a body consisting of a cover portion and an upstanding internally threaded skirt portion, said cover portion having an inner surface provided with a plurality of pitched female undercut locking elements and a plurality of smaller planar disturbances, said pitched locking elements extending into said cover portion and under said inner surface and the pitch being inclined at an angle to the face of said inner surface, a plastic deformable internal disc-shaped liner coextensive with said inner surface, and male protrusions molded on said disc engaging said undercut elements and female openings in said disc engaging said smaller planar disturbances, whereby said liner and closure are locked together to increase resistance against separation of the same.

2. The container closure of claim 1 wherein the smaller planar disturbances comprise conical protrusions.

3. The container closure of claim 1 wherein the smaller planar disturbances comprise oblong protrusions.

4. The container closure of claim 1 wherein the smaller disturbances comprise a mixture of oblong and conical protrusions.

5. A container closure having a body consisting of a cover portion having inner and outer surfaces and a skirt portion having inner and outer surfaces rising upwardly from the inner surface of the cover portion, the inner surface of the skirt portion being provided with pitched threads, the inner surface of the cover portion being provided with a plurality of planar disturbances comprising pitched locking elements and planar disturbances, the pitched locking elements being undercut openings extending down into and under the inner surface of the cover portion, the smaller disturbances comprising substantially protrusions extending above the inner surface of the cover portion, the pitch of the locking elements being inclined downwardly and at an angle to the inner surface of the cover portion, a plastic deformable internal disc-shaped liner coextensive with the inner surface of the cover portion, and means on said plastic liner engaging said planar disturbances comprising first planar disturbances molded on said liner that extend within and substantially take the shape of the pitched locking elements, and second planar disturbances molded in said liner that receive and substantially take the shape of the smaller protrusions, whereby said liner and closure are locked together to increase resistance against separation of the same.

6. The container closure of claim 5 wherein said plastic liner is formed from low density polyethylene.

7. The container closure of claim 5 wherein the locking elements in side elevation have a pitch that is approximately equal to the vertical pitch of the threads.

8. The container closure of claim 7 wherein the pitch of the locking elements in side elevation lies in the range of thirty minutes to fifteen degrees.

9. The container closure of claim 5 wherein the locking elements have a pitch in plan view that is inclined toward the center of the container closure.

10. The container closure of claim 9 wherein the pitch of the locking elements in plan view lies in the range of seventy-five degrees to eighty-nine degrees and thirty minutes.

11. The container closure of claim 7 wherein the body is composed of polystyrene.

References Cited by the Examiner

UNITED STATES PATENTS

| | | | |
|---|---|---|---|
| Re. 24,695 | 9/59 | Kirschenbaum | 215—40 |
| 1,956,012 | 4/34 | Egan | 264—268 |
| 2,039,757 | 5/36 | Von Till | 215—43 |
| 2,068,389 | 1/37 | Smith | 215—43 |
| 2,654,914 | 10/53 | Maier | 264—268 |

FOREIGN PATENTS 851,275  10/39  France.

FRANKLIN T. GARRETT, *Primary Examiner.*